F. S. LOWRY, DEC'D.
M. L. HART, ADMINISTRATRIX.
CERAMIC VESSEL.
APPLICATION FILED MAR. 1, 1919.
1,400,489.
Patented Dec. 13, 1921.
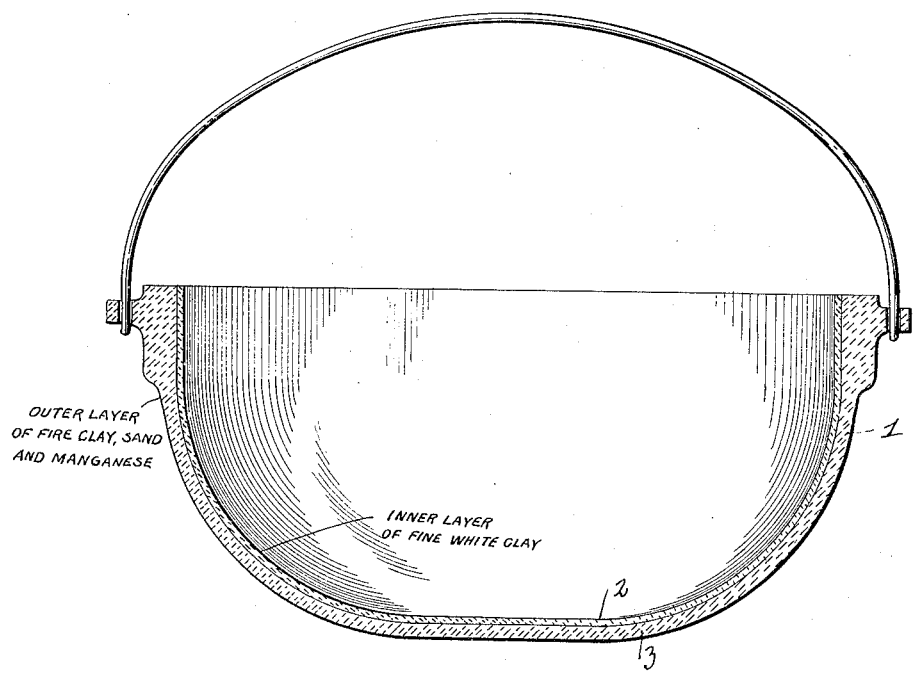
Inventor
Frederick S. Lowry.
By C. C. Shepherd
Attorney

UNITED STATES PATENT OFFICE.

FREDERICK S. LOWRY, DECEASED, LATE OF ROSEVILLE, OHIO, BY MILDRED LOWRY HART, ADMINISTRATRIX, OF ROSEVILLE, OHIO.

CERAMIC VESSEL.

1,400,489.     Specification of Letters Patent.     Patented Dec. 13, 1921.

Application filed March 1, 1919. Serial No. 280,087.

*To all whom it may concern:*

Be it known that FREDERICK S. LOWRY, deceased, a former citizen of the United States, whose residence was Roseville, in the county of Perry and State of Ohio, had invented certain new and useful Improvements in Ceramic Vessels, of which the following is a specification.

This invention relates to an improved earthenware receptacle and is particularly directed to the manufacture of fire clay cooking utensils, the object of the invention being to produce ware of this character which will be capable of successfully withstanding sudden changes in temperature, impervious to the action of acids and of considerable strength and durability so that the element of breakage in the handling and using thereof will be reduced to a minimum.

Another object of the invention resides in producing earthen cooking vessels or other similar receptacles wherein the body of the receptacle is formed to provide correlated inner and outer layers of substantially different physical characteristics, which are integrally united in the completed receptacle to render the same particularly efficient in its own field, the outer layer of the body being essentially formed from a mixture of compounded coarse black clay and a relatively low percentage of manganese which, when fired, will produce a tenacious structure of relatively rough granular formation and which is calculated to effectively absorb and transmit heat. However, it has been found that owing to the rough and uneven finish of the outer stratum a glaze can not be readily applied to its surface, therefore, use is made of the inner stratum which is formed from finely ground white clay and serves to impart a smooth finish to the interior of the receptacle, and to which the glazing may be readily applied so as to impart a vitreous surface thereto and which will present a perfectly smooth and hardened finish fully capable of resisting the deteriorating effects of acids and one which may be readily kept in a clean and sanitary condition.

In the drawing, the figure represents in vertical section a receptacle formed in accordance with the present invention, the strata composing the body of the receptacle being suitably labeled.

In carrying out the invention, the outer stratum or layer is compounded from, for example seven and one-half (7½) pounds of coarse black clay, composed of coarse fire clay and sand, together with two (2) ounces of manganese and one-half (½) pint of water and the inner stratum or layer comprising the body is formed from seven and one-half (7½) pounds of white clay together with one-half (½) pint of water. The materials forming the outer stratum are mixed or compounded for approximately two and one-half (2½) hours in order that they may be reduced to a state for insertion into a mold. The materials forming the inner stratum are preferably mixed for at least three (3) hours. Through the use of the outer layer thus compounded a body is produced which will possess the desired color, substantial structure and heat absorbing qualities necessary in earthen cooking utensils, and by virtue of the inner stratum, a surface is produced on the interior of the utensil which is characterized by its smoothness, absence of rough projections and one to which the glaze will readily adhere. The clay used in the inner stratum is also finer and will burn smooth while, on the other hand, the black clay and manganese has a tendency to burn more roughly, and if a glaze should be applied thereto objectionable lumps would be thrust through the glaze surface, hence the provision of the materials forming the inner stratum and the consequent formation of a perfectly smooth vitreous inner surface. The strata are combined during the process of molding a utensil, as will be clearly understood, that is, the outer stratum is first put in the mold and the inner stratum is subsequently added. Upon removal of the utensil from the mold, the same is glazed and placed in a dryer, where it is kept for three or four days and nights under the action of live steam until the same is thoroughly dry, after which it is placed in a kiln and is burnt from 54 to 60 hours and subjected to a temperature ranging up to 2600 degrees Fahrenheit. The weight of the utensils will of course vary before and after being subjected to the action of the dryer and the kiln. Any suitable glaze may be employed upon the interior stratum.

By virtue of the process above described, a cooking utensil is produced which may be subjected to the action of stove heat and upon which sudden changes in temperature will not be harmful. This is accomplished essentially through the provision of the two strata forming the body of the utensil, the outer stratum imparting unusual strength to the structure as a whole, and the inner stratum serving to permit the utensil to be maintained in a sanitary condition and impervious to the action of damaging acids.

What I claim is:

A ceramic vessel consisting of a body structure composed of compositely united inner and outer layers, said outer layer being composed of a mixture of fire clay, sand, manganese and water suitably molded into receptacle form, and said interior layer being composed of fire clay, sand and water, said inner layer serving to impart a smooth finish to the interior of said vessel so that a glaze may be applied thereto.

In testimony whereof I affix my signature.

FREDERICK S. LOWRY, *Deceased.*
By *Mildred Lowry Hart, Administratrix.*